(12) United States Patent  (10) Patent No.: US 6,324,936 B1
Harrington  (45) Date of Patent: Dec. 4, 2001

(54) CABLE TENSIONING DEVICE

(75) Inventor: Charles Harrington, Jackson, TN (US)

(73) Assignee: Murray, Inc., Brentwood, TN (US)

( * ) Notice: Subject to any disclaimer, the term of this patent is extended or adjusted under 35 U.S.C. 154(b) by 0 days.

(21) Appl. No.: 09/551,557

(22) Filed: Apr. 18, 2000

Related U.S. Application Data

(60) Provisional application No. 60/148,219, filed on Aug. 12, 1999.

(51) Int. Cl.7 ...................................................... F16C 1/10
(52) U.S. Cl. ..................................................... 74/501.5 R
(58) Field of Search .......................... 74/473.14, 473.15, 74/500.5, 501.5 R, 501.6, 502.2, 502.3, 502.4, 502.6

(56) References Cited

U.S. PATENT DOCUMENTS

| | | | | |
|---|---|---|---|---|
| 1,149,963 | * | 8/1915 | Spuhler | 74/501.6 |
| 2,128,300 | * | 8/1938 | Johnson | 74/502.2 |
| 2,191,543 | * | 2/1940 | Osborne | 74/502.2 |
| 2,476,703 | * | 7/1949 | Cope | 74/502.2 |
| 2,571,487 | * | 10/1951 | Rolfe et al. | 74/502.2 |
| 3,364,782 | * | 1/1968 | Freeland | 74/502.2 |
| 3,741,033 | * | 6/1973 | Wilke et al. | 74/512 |
| 4,523,609 | * | 6/1985 | Weck | 137/499 |
| 4,798,185 | * | 1/1989 | Driggers | 74/502.2 |
| 4,976,054 | * | 12/1990 | Jones | 37/235 |
| 5,518,097 | * | 5/1996 | Dabin | 74/502.3 |

FOREIGN PATENT DOCUMENTS

2025003 A * 1/1980 (GB) ................................... 74/501.5

* cited by examiner

*Primary Examiner*—Thomas R. Hannon
*Assistant Examiner*—Chong H. Kim
(74) *Attorney, Agent, or Firm*—Kevin E. Joyce

(57) ABSTRACT

A cantilevered leaf spring is formed at its proximal end to the housing of a power equipment unit. The distal end of the spring carries a bushing which engages a control cable for operating components of the unit. The proximal end of the spring is adjustably secured to the housing to impart a desired spring force to the cable so as to remove slack therefrom and to properly tension the cable.

9 Claims, 3 Drawing Sheets

CABLE TENSIONING DEVICE

This Application claim benefit to provisional Application No. 60/148,279 Aug. 12, 1999.

BACKGROUND OF THE INVENTION

1. Field of the Invention

The present invention relates to a device for the tensioning of a cable used to control the activation of a drive and/or brake of a power equipment unit, such as a walk-behind snow thrower or power lawnmower.

2. Prior Art

Control cables are used in various types of power equipment for activating drive and/or brake connections in response to the operator's movement of a control handle. The cable extends between the control handle and the component being controlled.

In order to achieve proper control, the cable must be correctly tensioned. Because cable tension can vary during operation—as a result, for example, of the stretching of a drive belt—the cable tension must be adjusted. This typically is done periodically by manually changing the effective length of the cable between the control handle and the controlled component.

SUMMARY OF THE INVENTION

The present invention provides an arrangement for automatically and continuously maintaining the correct tension of a control cable. A cantilevered spring is adjustably secured at its proximal end to a housing of a power equipment unit with which the cable is associated. The distal end of the spring engages the cable to apply spring force thereto thereby tensioning the cable as it removes slack. The proximal end of the spring is adjustably positioned on the housing so as to permit variance of the spring force applied to the cable.

BRIEF DESCRIPTION OF THE DRAWINGS

The invention now will be described in greater detail with respect to the accompanying drawings wherein.

DETAILED DESCRIPTION OF PREFERRED EMBODIMENTS OF THE INVENTION

The invention will be described hereinafter with respect to its use in connection with a snow thrower. It will be understood, however, that it is useful in connection with other products requiring cable tensioning, including power lawnmowers.

Figure 1:
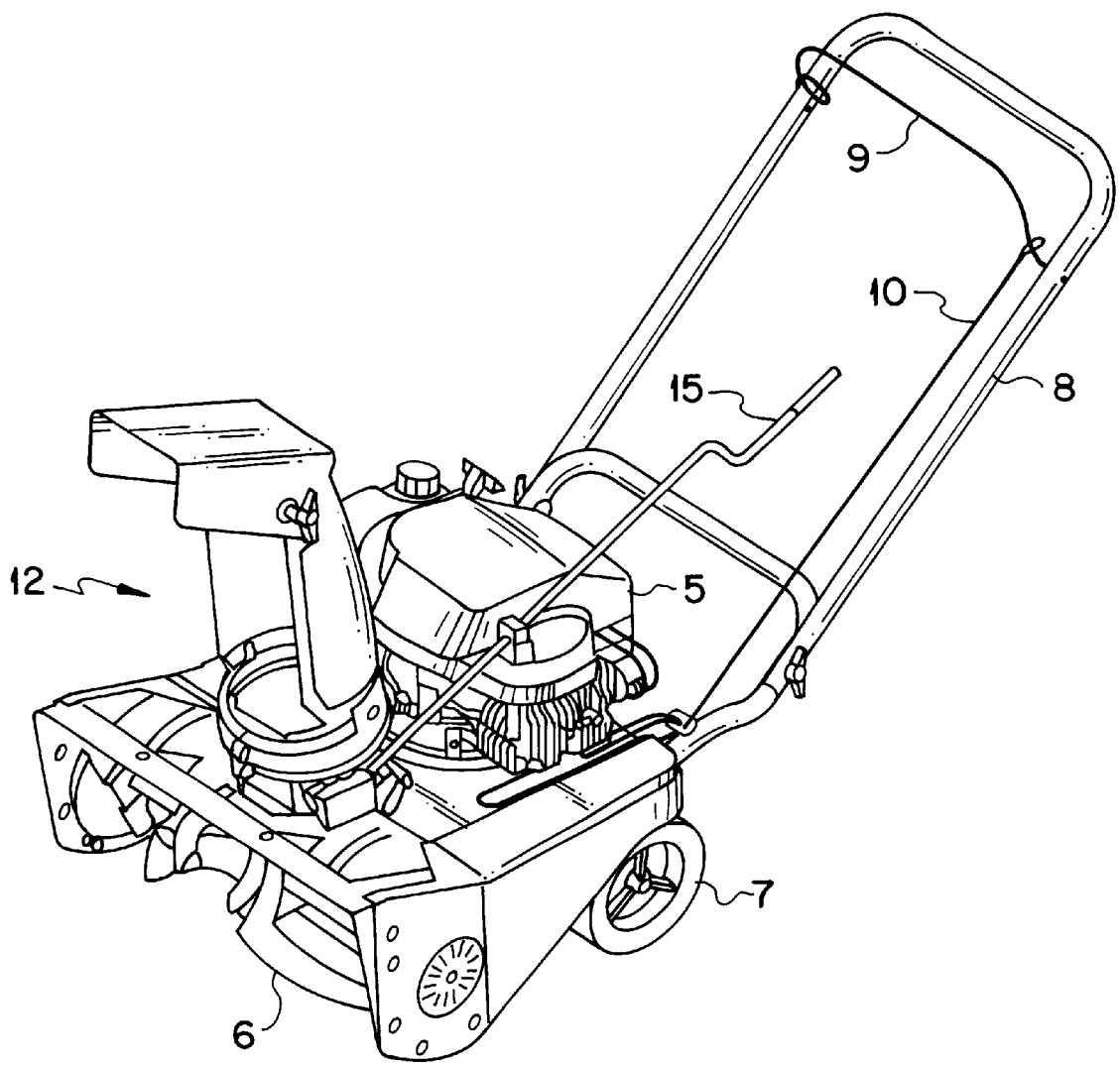
FIG. 1 is a perspective view of a snow thrower containing a first embodiment of a cable tensioning device according to the invention.

Referring to FIG. 1, a housing-supported engine 5 is provided with a vertical output drive shaft (not shown) which passes through the upper surface of the housing. The output is connected to an auger 6 supported within the forward portion of the housing by a drive connection (not shown). The rear portion of the housing is supported by wheels 7. A handle 8 extends rearwardly of the housing. A control bar 9 is pivotally connected to the upper portion of handle 8 and is capable of being actuated by an operator. The control bar 9 is connected by a cable 10 to the drive connection between the engine's output drive shaft and auger 6. During operation of the engine, the operator selectively actuates the control bar 9 to complete the drive connection whereby snow is moved by the auger and is discharged from the housing through a discharge port provided in the housing above the central portion of auger 6. An adjustable discharge chute 12 is joined to the port to direct snow thrown by auger 6. A control rod 15 extends from one of its ends, adjacent handle 8, to a worm gear joined to its opposite end. The worm gear is in operative relationship with chute 12 to control the positioning of the chute in response to actuation of the control rod 15.

Figure 2:
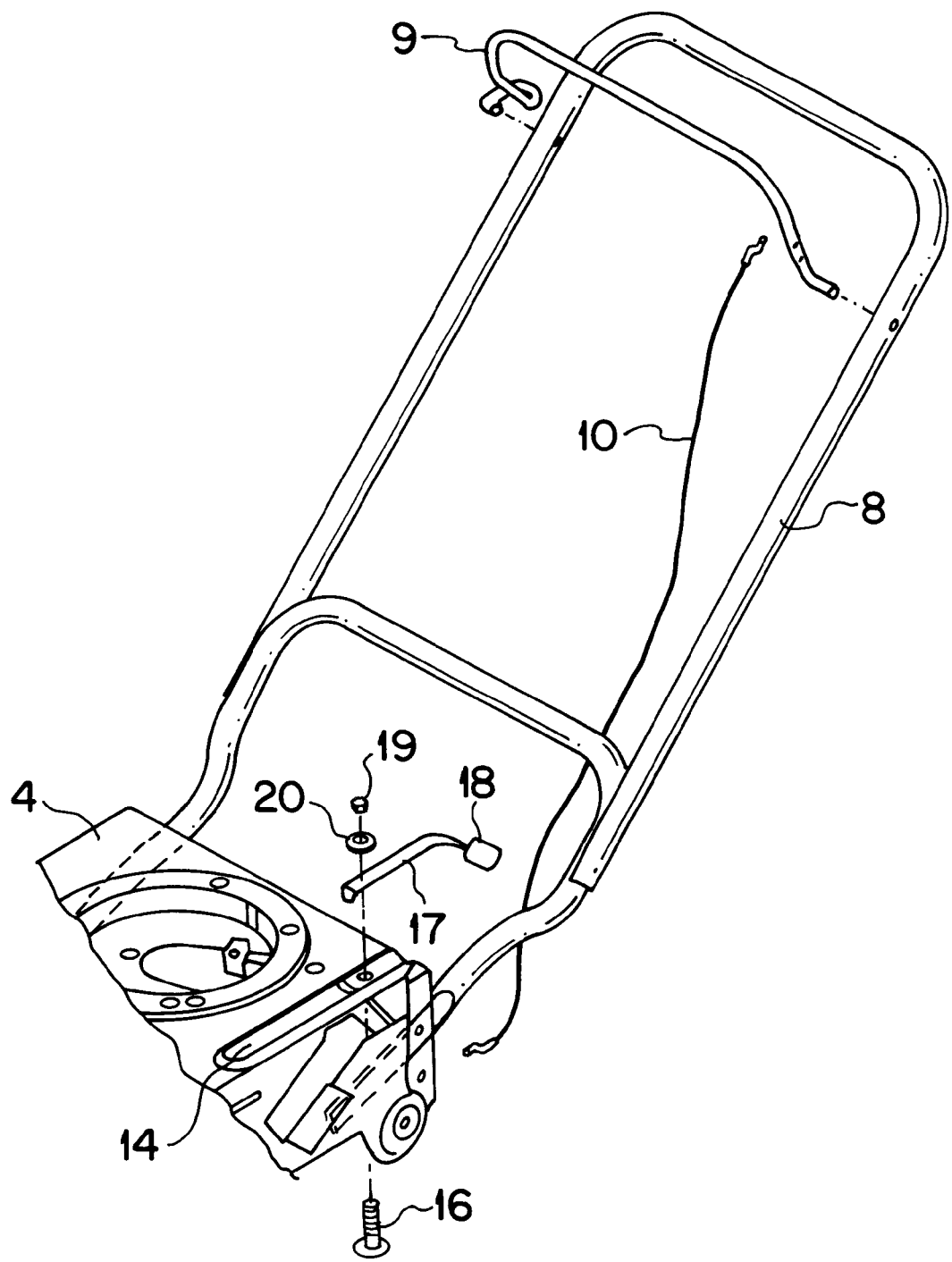
FIG. 2 is a fragmented perspective view of a portion of the arrangement shown in FIG. 1.

Referring to FIG. 2, the engine 5 has been removed from housing 4 to better expose the upper surface of the housing, which surface has formed therein a track 14 extending longitudinally of the housing. The track is undercut along its edges to receive and retain the head of an upwardly projecting bolt 16. The relative dimensioning of the bolt's head and the undercut edges of track 14 is such that the bolt can slide along the track while being retrained within the track. Bolt 16 passes through an opening in a proximal end of a cantilevered leaf spring 17. The distal end of the spring is bent so as to be inclined downwardly, and it supports a bushing 18 which preferably has a groove formed in its underside so as to receive and guide control cable 10 as it extends from control bar 9 through an opening (not shown) in the rear of the housing 4 to the drive connection between the engine 5 and the auger 6.

The leaf spring 17 serves to apply tension to cable 10 when the cable is joined at its respective ends to control bar 9 and the aforesaid drive connection. This is accomplished by the spring's engagement with the cable through bushing 18. More particularly, to remove slack from the cable and to establish a desired cable tension, a nut 19 at a threaded end of bolt 16 is loosened and the proximal end of the leaf spring is slid along track 14 with the cable bushing 18 engaging the control cable. When proper tension is achieved, the nut is tightened onto a washer 20 to secure the leaf spring in place. The spring force applied to the cable will maintain tension on the cable despite minor variations in the effective length of the cable arising during operation.

Figure 3:
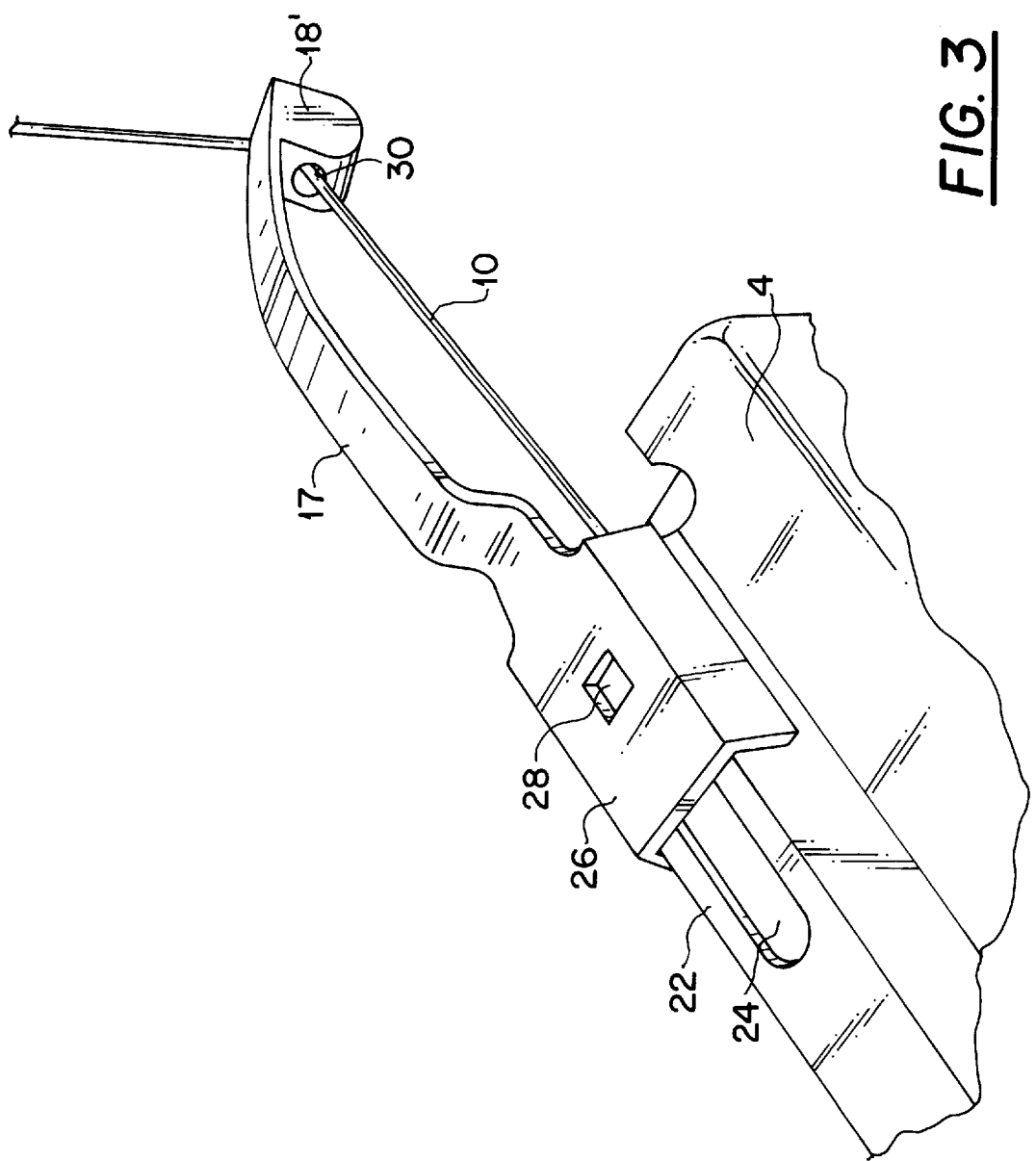
FIG. 3 is a fragmented perspective view illustrating an alternative embodiment of the invention.

An alternative embodiment of the invention is shown in FIG. 3. More particularly, a different arrangement for adjustably securing the proximal end of leaf spring 17 to the housing 4 is provided. Also, the bushing 18 is positioned differently at the distal end of the spring.

The housing 4 is formed with an inverted U-shaped portion 22 provided with an elongated slot 24. The proximal end of spring 17 is provided with an inverted U-shaped portion 26 which is complementary with portion 22 whereby the latter serves as a track along which portion 26 can slide. An aperture 28 is provided in portion 26 which is aligned with slot 24. Consequently, a bolt (not shown) can project upwardly through slot 22 and aperture 28, the bolt head underlying portion 22 adjacent the side edges of the slot. Thus, when a nut (not shown) is secured to the free end of the bolt, the proximal end of spring 17 is secured to the housing 4 at a desired location along slot 24.

A bushing 18' is secured to the distal end of spring 17. However, instead of projecting laterally from the spring as in the embodiment of FIGS. 1 and 2, bushing 18' projects downwardly from the spring's distal end and has an aperture 30 therein for receiving the control cable 10.

Operation of the FIG. 3 embodiment of the invention corresponds with that described with respect to FIGS. 1 and 2. Consequently, the description of operation need not be repeated.

What is claimed is:

1. A device for tensioning a cable for controlling a component of a power equipment unit, said device comprising:

a component housing;

an elongated guide means provided on said housing for receiving a proximal end of a cantilevered leaf spring and for positioning said proximal end relative to the housing;

means for selectively securing said proximal end to the housing at desired positions along the length of the guide means; and means disposed at a distal end of the leaf spring for engaging and variably tensioning the control cable dependent on where along the guide means said proximal end is selectively secured to the housing.

2. A tensioning device according to claim 1, wherein said guide means comprises a track along which the proximal end of the leaf spring is movable, said securing means being operatively related to the track and passing through said proximal end to permit the leaf spring to be selectively secured to the housing.

3. A tensioning device according to claim 2, wherein said securing means comprises a bolt having a shaft and a head at one end of the shaft, and wherein the track has undercut side edges which overlie the bolt head when said bolt head is positioned within the track, said shaft passing through the proximal end of the leaf spring and being adapted to receive a nut at an end of the bolt opposite the bolt head for securing the proximal end of the leaf spring to the housing.

4. A tensioning device according to claim 2, wherein said guide means comprises an inverted U-shaped portion of the housing for receiving a complementary U-shaped portion of the proximal end of the leaf spring, one of said U-shaped portions having an elongated slot therein and the other U-shaped portion having an aperture therein.

5. A tensioning device according to claim 4, wherein said securing means comprises a bolt having a shaft which passes through said slot and aperture, said shaft being adapted to receive a nut for securing the proximal end of the leaf spring to the housing.

6. A tensioning device according to claim 2, wherein said cable engaging means includes a bushing laterally disposed relative to a longitudinal axis of the leaf spring.

7. A tensioning device according to claim 3, wherein said cable engaging means includes a bushing laterally disposed relative to a longitudinal axis of the leaf spring.

8. A tensioning device according to claim 4, wherein said cable engaging means includes a bushing disposed on an underside of said distal end and provided with an aperture for receiving the cable.

9. A tensioning device according to claim 5, wherein said cable engaging means includes a bushing disposed on an underside of said distal end and provided with an aperture for receiving the cable.

* * * * *